June 10, 1952  G. J. CAMPBELL  2,599,894
FORMING APPARATUS FOR EDIBLE FOOD PRODUCTS
Filed Dec. 9, 1949  2 SHEETS—SHEET 1
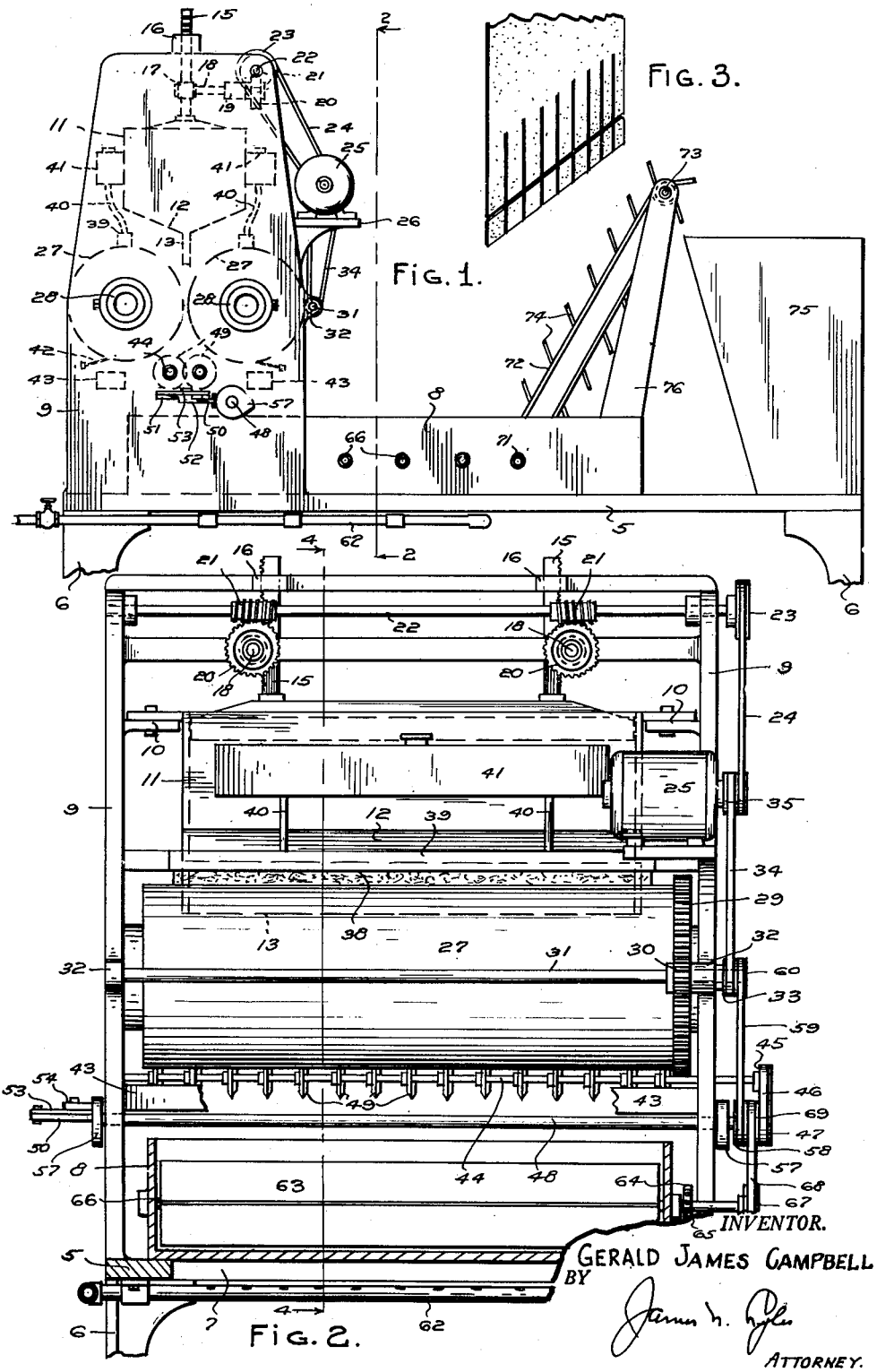
INVENTOR.
GERALD JAMES CAMPBELL
BY
ATTORNEY.

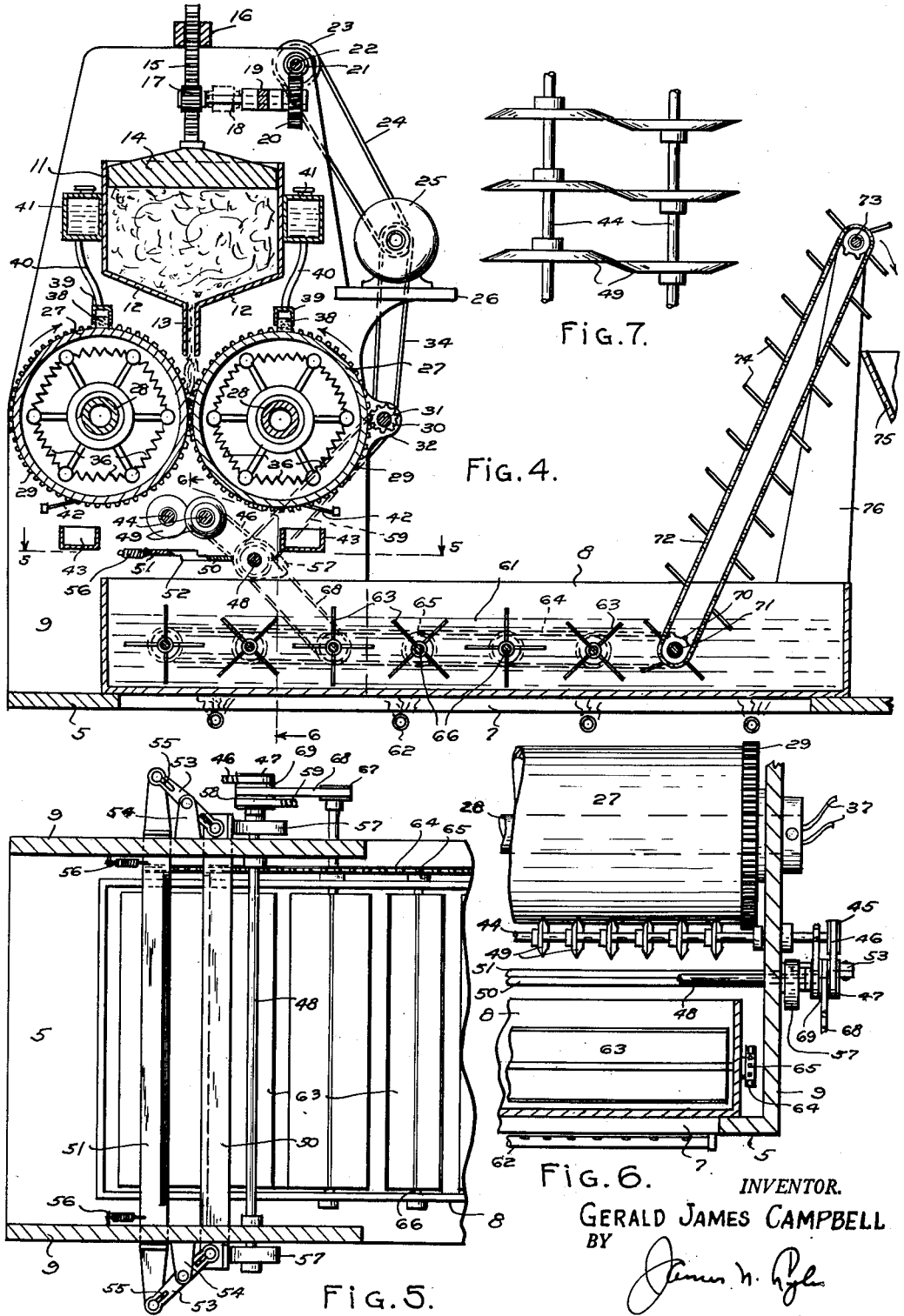

Patented June 10, 1952

2,599,894

UNITED STATES PATENT OFFICE 2,599,894

FORMING APPARATUS FOR EDIBLE FOOD PRODUCTS

Gerald James Campbell, Miami, Fla.

Application December 9, 1949, Serial No. 132,190

4 Claims. (Cl. 107—4)

This invention relates to improvements in a forming device for edible food products.

It is an object of the present invention to provide a machine for continuously forming, pre-cooking and cutting edible food products for subsequent discharge into a cooking medium.

The primary object of the present invention is to produce a relatively thin continuous sheet of edible dough composition from a feed hopper, passing the sheet between a pair of heated compressing and precooking drums, cut the sheet into a plurality of ribbons, then cutting the ribbons at right angle to form a plurality of relatively identical uniform chips for subsequent deposit into a cooking medium.

It has been found, that a predetermined edible dough mixture having particular ingredients in its formula can be formed and cooked by the deep-fry process, with the resultant product being very similar to the well known potato chips, but having none of the undesirable qualities of potato chips, and having a distinctive flavor and digestibility impossible with the starchy potato chips. Further, the dough can be flavored with various essences, vegetable coloring etc. and the final product is most attractive and desirable.

The invention further contemplates a machine having a continuous feed dough hopper arranged directly over a pair of slightly spaced heated rotatable drums whereby the dough is fed from the hopper in a continuous relatively wide sheet that is parallel with the drums, passing the sheet between the drums where it is partially cooked, arranging a plurality of cutting knives directly below the drums and in a position to receive the partially cooked and now relatively thin sheet whereby the sheet is cut vertically into a plurality of ribbons of equal width, arranging a pair of horizontally disposed cut-off knives in the path of the ribbons, whereby the ribbons are cut transversely into a plurality of squares, oblongs or the like.

The invention consists of novel features of construction that is wholly automatic, yet simple and economical to construct and operate, is strong, durable, readily lends itself to the production of other articles either edible or non-edible, is highly efficient and results in a food or other product of outstanding quality.

Other important objects and advantages of the invention will be readily apparent during the course of the following description, reference being had to the accompanying drawings, wherein has been illustrated a preferred embodiment of the invention and wherein like characters of reference denote like parts throughout the several figures.

In the drawings:

Figure 1 is a side elevation of a machine constructed in accordance with the invention, Figure 2 is a transverse vertical section thereof, taken on line 2—2 of Figure 1, Figure 3 is a fragmentary perspective view illustrating the manner of cutting the dough, Figure 4 is a vertical longitudinal section of the machine, taken on line 4—4 of Figure 2, Figure 5 is a fragmentary horizontal section on line 5—5 of Figure 4, Figure 6 is a fragmentary transverse vertical section taken on line 6—6 of Figure 4, and Figure 7 is a fragmentary enlarged plan view of a plurality of cutting discs.

Referring specifically to the drawings, the numeral 5 designates a supporting base of generally rectangular shape, having legs 6, whereby the base is supported at a proper elevation. The base is cut away, as at 7 and is normally covered by a trough-like cooker 8, to be more fully described. Upstanding from the base 5, and parallel with each other, are a pair of side plates 9, fixed with respect to the base 5 and forming the mounting means for mechanism to be described.

Supported, as by end brackets 10, from the inner walls of the plates 9, is a dough receiving and discharge hopper 11, generally rectangular in top plan and extending transversely of the machine. The hopper is formed open at its top and has a downwardly inclined bottom 12, terminating in a relatively narrow discharge nozzle 13 extending for the full length of the hopper. A follower and ejector plate 14 has a sliding fit within the upper end of the hopper and partakes of vertical movement to force the dough from the nozzle in a continuous sheet. The ejector plate 14 is progressively moved downwardly against the dough by a pair of spaced rack bars 15 fixed thereto and vertically disposed and parallel with each other. The bars operate through guide bearings 16 supported from the tops of the plates 9. Vertical motion is imparted to the rack bars and the ejector plate 14, by a pair of gears 17, carried by shafts 18, journalled in bearings 19, supported from the side plates 9. The shafts 18 are driven through the medium of worm wheels 20, in turn being driven by worms 21 carried upon a shaft 22. The shaft 22 is journalled at its ends in bearings formed on the plates 9. One extended end of the shaft 22 carries a grooved pulley 23, engaged by an endless belt 24, driven from a prime mover which, in the present instance is indicated as an electric motor 25, supported upon a bracket 26, carried by one side plate 9.

Mounted beneath the hopper 11, is a pair of horizontally disposed cylindrical drums 27, parallel with respect to each other and with the hopper and its discharge nozzle. The drums are slightly spaced from each other and rotate in unison upon fixed shafts 28. Each drum carries a gear 29, meshing with each other, as clearly shown, so that the drums turn in opposite directions and toward each other. One gear 29 is driven from a small pinion gear 30, carried by a cross shaft 31, journalled in bearings 32 of the plates 9. Each of the drums is journalled for rotation on the shafts 28. The shaft 31 is driven from a small pulley 33, in turn driven through the medium of a flexible endless belt 34 from a small pulley 35 fixed upon the shaft of the motor 25. The drive reduction is such that the drums rotate relatively slow, or approximately four revolutions per minute. However, the speed of the drums may vary according to the material to be treated. The drums are tubular and are heated by any conventional elements 36, supported upon the fixed shafts 28. Suitable lead-in electrical conductors 37 supply current to the elements 36 and the degree of heat is determined by any suitable regulator, not shown.

It has been found essential in most instances in a machine of this type where it is employed to produce edible food products, that the outer polished surfaces of the drum be continuously oiled. For this purpose, parallel wicks 38 extend for the major length of the drum. The wicks are carried by distributor heads 39, supported at their ends by the plates 9. Each distributor head has connection through the medium of pipes 40, with reservoirs 41, for convenience, supported upon the sides of the hopper 11. The oil, in this instance for application to the drum surfaces, is an edible oil commonly employed in cooking. The wicks maintain a constant film of oil on the drum surfaces during the operation of the machine. It will be observed, by reference to Figure 4, that the discharge from the nozzle 13 is directly between the spacing of the drums. Scrapers 42, supported from the plates 9, engage the surfaces of the drums to maintain them free of any possible accumulation and any material scraped therefrom falls into troughs 43, likewise supported between the plates 9.

Journalled slightly below the drums 27 and spaced to either side of the vertical center line of the discharge nozzle 13, are a pair of parallel horizontal shafts 44. The shafts 44 are journalled in the plates 9 and one shaft is extended and carries at its outer end a pulley 45, driven from an endless belt 46, in turn driven from a pulley 47, fixed for rotation with a shaft 48, to be described. Each shaft 44 has fixed thereon a plurality of cutting discs 49, having a flat surface and a bevelled edge. The flat surfaces of the discs upon one shaft coact with the flat surfaces of the discs upon the other shaft, thus establishing a relatively thin cutting edge. While the shafts may be geared together, it is contemplated that one shaft will be positively driven from the belt 46 and the opposite shaft and its discs will serve as idlers. As shown, the coacting discs present a plurality of equidistantly spaced vertically disposed cutting edges adapted to cut the sheet of dough emerging from the drums, into a plurality of identical ribbons. The precooking of the dough as it passes between the drums enables the discs to cut the sheet perfectly without the dough adhering to the cutters. The cutting of the sheet into ribbons is generally illustrated in Figure 3.

Since it is also contemplated that the finished product shall be in the form of substantially identical squares or, as will be referred to as chips, it becomes necessary that means be provided to cut the ribbons in timed relation to the speed of the drums. To accomplish this, horizontal and reciprocatory cutter bars 50 and 51 are slidably mounted in slots 52, formed in the plates 9. The bars 50 and 51 extend beyond the outer sides of the plates 9 and their terminal ends are connected by shifting links 53. The links 53 are pivotally supported intermediate their ends upon brackets 54, carried by the plates 9. The ends of the links are pivotally connected with the ends of the bars 50 and 51 and slots 55 are formed in the ends of the links to permit freedom of pivotal movement of the links with respect to the bars. It will therefore be obvious, that when the bar 50 is moved toward the bar 51, the bar 51 will simultaneously move toward the bar 50, with their bevelled cutting edges meeting on the vertical center line of the nozzle 13. Springs 56, connected with the bar 51 and with the plates 9, serve to maintain the bars in separated position. Means are provided to automatically shift the bar 50 toward the bar 51, comprising a pair of cams 57, fixed upon the shaft 48 and rotatable therewith. It will be aparent, that when the cams rotate, they will bear against the edges of the bar 50 to shift it toward the bar 51 and, through the medium of the links 53, cause the bar 51 to shift toward the bar 50 to overlapping position. The shifting of the bars is relatively quick and so timed with respect to the vertical cutters, that predetermined uniformly shaped chips will be cut from the ribbons as they are continuously fed downwardly. The shaft 48 carries at its outer extended portion, a grooved pulley 58, driven from an endless belt 59, from a pulley 60, fixed upon the shaft 31.

As the chips are cut from the ribbons, they fall by gravity into the cooker 8, containing boiling vegetable oil 61, heated by any desirable source of energy, such as gas burners 62, located beneath the base 5. The cooker 8 is described in detail, although forming no part of the present invention. A plurality of impellers 63, transversely arranged in the cooker trough 8, rotate in unison through the medium of an endless chain drive 64, engaging sprockets 65 carried at the outer extended ends of the shafts 66 of the impellers. One shaft 66 is further extended and carries a grooved pulley 67, engaged and driven by an endless belt 68, driven from a pulley 69, fixed upon the shaft 48. The chain belt 64 is further extended and drives a sprocket 70, fixed upon a shaft 71 of an inclined pick-up and discharge conveyor 72. The upper shaft 73 of the conveyor supports sprocket wheels for the traverse of the conveyor. The conveyor 72 is equipped with pick-up fingers 74 to lift the chips from the oil for upward movement and discharge into any suitable storage hopper 75. The upper shaft of the conveyor is journalled in upright supports 76. Each impeller carries a plurality of impeller blades that progressively move the chips toward the conveyor 72, with the number of impellers calculated to move the chips throughout the length of the cooking area in a predetermined interval of time that is just sufficient to properly cook the product.

In order to quickly raise the ejector plate 14, when it is desired to recharge the hopper 11, the gear 17 and its shaft 18 is shiftable to a position of disengagement with the rack bars 15, thus permitting the ejector plate to be raised to its upper limit for clearance above the top of the hopper. The shaft 18 will obviously be splined to the worm gear 20. After recharging, the gear is moved to meshed engagement with the teeth of the rack bars 15 and the machine is then ready for operation.

In the use of the device, the hopper 11 having been fully charged with dough of the proper consistency and the ejector plate moved into contact with the batch, the drums are heated and the cooker is prepared to the proper temperature. The motor is then started and through the medium of the worm and worm wheel drives 22 and 21, the gears 18 are slowly driven to move the racks downwardly, causing the dough to be fed from the nozzle 13 in a wide sheet, slowly moving downwardly in a vertical plane and enters between the drums 27. The speed of the drums is sufficient to receive and compress the sheet at the speed of its discharge from the nozzle. As the sheet passes between the drums, it is partially cooked and as it extends downwardly below the drums, the sheet engages the vertical rotary cutters and its continuous movement through the cutters presents a plurality of vertically depending ribbons. The gear reduction from the motor 25 to the several mechanisms have been predetermined for imparting the proper speed to the drums so as to insure of the right degree of cooking time to the dough during its passage therebetween. The ejector plate 14 and its feed means are likewise timed to the speed of the drums, so that just sufficient dough will be forced from the nozzle to maintain a constant sheet being fed to the drums. As the ribbons continue to be fed downwardly after passing the cutters 49, they pass between the cutting bars 50 and 51 and the bars are so timed as to move together under the influence of the cams 51 to cut the ribbons transversely into predetermined size chips. The movement of the bars 50 and 51 is rapid, quickly cutting the ribbons and then moving away from each other and away from the continuously moving ribbons. The separating of the bars 50 and 51, avoids the danger of dough adhering thereto and permits the ribbons to pass downwardly the proper distance uninterrupted before the bars move to cutting position.

The chips, upon being cut, fall into the boiling oil of the cooker trough 8 and are propelled along by the impellers until the chips are finally picked up by the conveyor. The interval of time necessary for the chips to be carried from the point of entry to the point where the conveyor picks them up, is just sufficient to properly cook the article, all other elements being equal, such as the proper cooking temperature of the oil 61. The drums 27 must likewise be heated to a predetermined temperature so as to maintain just sufficient heat to partially cook the dough. It has been found essential, that a film of oil be constantly applied to the working surfaces of the drums to prevent the dough sticking thereto and to impart a quality to the dough sheet that gives it a certain dense form, with the oil compressed into the dough as it passes between the drums for its initial cooking. The sheet after leaving the drums is comparatively dense and will not crumble or break when engaged by the cutters 49 and cuts cleanly. The degree of oil obviously may be regulated as to the quantity fed to the wicks 38. Should any particles of dough adhere to the drums, it is scraped therefrom by the scrapers 42 and falls within the troughs 43. The collecting troughs 43 prevent any matter scraped from the drums from falling into the cooker 8.

It will be apparent from the foregoing that a very novel and highly efficient machine has been provided to produce an edible food product having outstanding qualities. The structure is wholly automatic after the dough hopper has been charged and will continuously feed, cut, cook and deposit the food product into a suitable hopper without further handling. The drive means for the several parts are simple and inexpensive and are all so timed as to maintain a constant production.

While a preferred example of the machine has been illustrated and described, it will be apparent that various changes in the shape, size and arrangement of parts may be resorted to as fall within the spirit of the invention or the scope of the subjoined claims.

Having described my invention, what I claim as new and desire to secure by Letters Patent is:

1. An apparatus for forming edible chips that comprises a base, a pair of upstanding side plates carried thereby, a dough hopper disposed between the plates and having an elongated discharge nozzle at its lower end, an ejector plate operable in the hopper for continuously forcing the dough from the nozzle in sheet form, a pair of cylindrical spaced apart drums arranged beneath the hopper and equidistantly spaced upon either side thereof for receiving and compressing the dough sheet from the nozzle, means for heating the drums, means for rotating the drums in opposite directions, continuous feed means for the ejector plate in timed relation to the rotation of the drums, a prime mover for the movement of the ejector plate and drums, a plurality of vertically arranged co-acting rotary cutters disposed beneath the drums to receive and slice the sheet into vertically depending ribbons continuously during its travel, and cutter bars arranged beneath the rotary cutters to received and cut the ribbons at right angle into chips.

2. A forming apparatus for food products that comprises an elongated supporting base having parallel upstanding side plates, a dough hopper disposed between and supported by the side plates, a flat nozzle formed upon the bottom of the hopper for its full length, a follower ejector plate operable in the hopper for ejecting the dough from the nozzle continuously in relatively thin sheet form, reduction gear means for moving the plate against the dough in the hopper, a prime mover for the gear means, a pair of slightly spaced horizontally arranged cylindrical drums rotatably supported in parallelism to the nozzle for receiving the sheet of dough continuously, heating elements in the drums, reduction gear means for rotating the drums in timed relation to the ejecting means, said drums adapted to compress and partially precook the sheet during its passage therebetween, a plurality of disc cutters arranged beneath the drums to receive and cut the precooked sheet vertically into ribbons of equal width, a pair of co-acting cutter bars disposed beneath the disc cutters to receive and cut the ribbons transversely into chips.

3. A forming device for food products that comprises a base plate having a pair of parallel upstanding side plates, a dough hopper supported between the plates and transversely of the base, an elongated discharge nozzle formed on the bottom of the hopper, a follower ejector plate operable in the hopper for forcing the dough through the nozzle for discharge in sheet form, reduction gear means for continuously moving the ejector, a prime mover for the gear means, a pair of horizontally disposed and parallel slightly spaced cylindrical drums rotatably supported between the side plates and parallel with and equidistantly spaced upon either side of the nozzle for receiving therebetween the dough sheet, the surface of the drums being smooth and polished, heating elements in the drums, the drums geared together for opposite rotation, reduction gearing for rotating the drums in timed relation to the discharge of the dough sheet from the nozzle, said last named gear driven from the prime mover, means for oiling the surfaces of the drums, a plurality of driven and vertically disposed cutting discs arranged beneath the drums and a corresponding number of idler cutting discs arranged beneath the drums and cooperating with the driven discs, the several discs adapted to jointly receive and cut the dough sheet as discharged from the drums into vertically depending ribbons of equal width, a pair of separable cutter bars disposed beneath the rotary cutting discs, means for shifting the bars outwardly from the vertical line of the dough sheet, cam means for moving the bars together to cut the ribbons transversely into equal size chips, timed driving means for the cams and drive means for the driven discs.

4. An apparatus for the forming and cutting of a food product consisting of a base plate having a pair of upstanding parallel side plates formed thereon at one end, a dough hopper supported at its ends to the plates and horizontally arranged transversely of the device, the hopper open at its top and provided with an inclined bottom terminating in a flat nozzle for the full length of the hopper, an ejector plate vertically movable into and out of the hopper for the discharge of the dough through the nozzle in sheet form, rack bars for the control of the ejector plate, gears engaging the bars, worm and worm wheels for operating the gears, the gears being shiftable out of engagement with the racks, a prime mover for operating the worm and worm wheels, a pair of horizontally arranged drums of hollow cylindrical form disposed transversely of the device and parallel with the hopper, the drums having smooth polished surfaces, fixed shafts for the support of the drums, gears carried at one end of the drums and meshing with each other to turn the drums in opposite directions, heating elements arranged in the drums and supported by the fixed shafts, a gear for driving one of the drums, drive means from the prime mover for the last named gear, surface oilers for each drum that extend for the major length of the drums, reservoirs for the supply of oil to the oilers, the said drums being equidistantly spaced from the vertical center line of the nozzle for receiving the sheet of dough therebetween, a pair of horizontal shafts disposed below the drums, parallel thereto and equidistantly spaced to either side of the vertical line of the nozzle, a plurality of cutter discs mounted on the shafts in predetermined spaced relation, with the cutters of each shaft slightly overlapping the cutters of the companion shaft, bevelled cutting edges on the discs, the discs being vertically disposed to received the sheet of dough from the drums to cut it into a plurality of vertical ribbons, driven means carried by one of the shafts, a pair of horizontally disposed shiftable cutter bars disposed below the discs and parallel to the drums, the bars shiftable toward and from each other, springs for moving the bars to retracted position, cams rotatably supported for contact with the opposite ends of one bar, a shaft for the support of the cams, link means connecting the ends of the bars, a bracket for the support of the links carried by the base plates, the several shafts journalled in the base plates, drive means for the cam shaft from the prime mover, drive means from the cam shaft to the disc shaft, and scrapers for the drum surfaces.

GERALD JAMES CAMPBELL.

REFERENCES CITED

The following references are of record in the file of this patent:

UNITED STATES PATENTS

| Number | Name | Date |
| --- | --- | --- |
| 1,062,627 | Williams | May 27, 1913 |
| 1,138,747 | Graves | May 11, 1915 |
| 1,382,926 | Mitchell | June 28, 1921 |
| 1,389,976 | Patten | Sept. 6, 1921 |
| 1,471,727 | Gomez | Oct. 23, 1923 |
| 1,629,355 | Morrow | May 17, 1927 |
| 1,911,887 | Fike | May 30, 1933 |
| 2,454,316 | Haecks | Nov. 23, 1948 |

FOREIGN PATENTS

| Number | Country | Date |
| --- | --- | --- |
| 16,027 | Norway | Feb. 4, 1907 |